United States Patent [19]

Cardo

[11] 4,430,100

[45] Feb. 7, 1984

[54] SIDE STREAM SEPARATION SYSTEM FOR MECHANICAL COLLECTORS AND METHOD OF CONSTRUCTING SAME

[76] Inventor: Philip T. Cardo, 176 Forestwood Dr., Northfield, Ohio 44067

[21] Appl. No.: 270,969

[22] Filed: Jun. 5, 1981

[51] Int. Cl.³ .............................................. B01D 45/12
[52] U.S. Cl. .......................................... 55/344; 55/1; 55/348; 55/431; 55/DIG. 14; 55/315; 29/DIG. 77; 209/144; 209/154
[58] Field of Search ...................... 55/1, 267, 269, 315, 55/337, 344, 346–349, 414, 418, 431, 466, DIG. 14, DIG. 5; 209/144, 154; 29/DIG. 6, DIG. 77

[56] References Cited

U.S. PATENT DOCUMENTS

| | | | |
|---|---|---|---|
| 1,847,304 | 3/1932 | Bradshaw et al. | 55/344 |
| 2,515,894 | 7/1950 | Polk | 55/343 |
| 2,762,450 | 9/1956 | Westlin | 55/338 |
| 3,365,058 | 1/1968 | Petersen | 55/348 |
| 3,520,114 | 7/1970 | Pall et al. | 55/348 |
| 4,242,115 | 12/1980 | Harold et al. | 55/414 |
| 4,314,830 | 2/1982 | Skiven et al. | 55/344 |

OTHER PUBLICATIONS

"The Side Stream Separator", a General Motors Report believed to bear a date of Apr. 1980; was made public on 5/21/80.
"Equipment Sales Manual", The John Wood Company, Bulletin No. 140.
"How It Works," The Western Precipitation Fractionating System.

*Primary Examiner*—David L. Lacey
*Attorney, Agent, or Firm*—David A. Burge

[57] ABSTRACT

An improved apparatus for extracting a side-stream flow of fine-particulate-laden effluent gases from a mechanical separator employs the use of a plenum inside the housing of the separator with a plurality of pickup openings communicating the plenum with spaces among and about the separator's collector tubes. A side-stream flow of fine-particulate-laden effluent gases is extracted from regions among and about the collector tubes by drawing these gases through the pickup openings and into the plenum, from the plenum into a ductwork communicating with the plenum, and from the ductwork through a separator where particulate matter is filtered from the side-stream flow. The method of constructing the apparatus is also disclosed.

5 Claims, 4 Drawing Figures

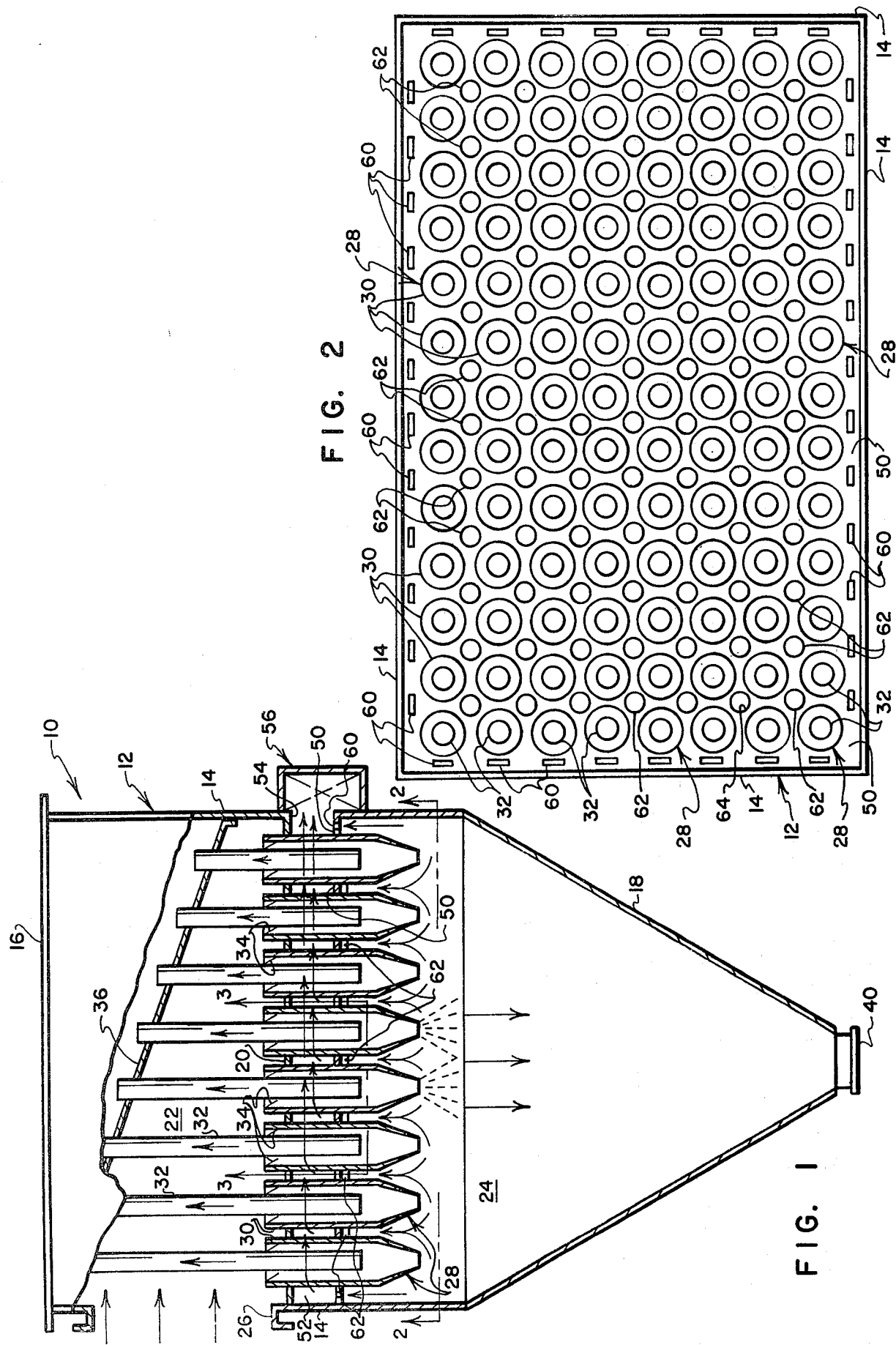

SIDE STREAM SEPARATION SYSTEM FOR MECHANICAL COLLECTORS AND METHOD OF CONSTRUCTING SAME

BACKGROUND OF THE INVENTION

1. Field of the Invention

The present invention relates to an improved method and apparatus for controlling particulate emissions from coal-fired boilers and the like, and, more particularly, to the use of an improved system for extracting a side-stream flow of fine-particulate-laden effluent gases from a mechanical separator so that the side-stream flow can be treated to remove particulate emissions.

2. Prior Art

Large, stoker-fed, coal-fired boilers are used in commercial and industrial installations to provide heat for generation of electricity, for certain industrial processes which require high heat input, and for the heating of buildings. Exhaust gases from such boilers contain a sufficiently high quantity of particulate matter to require treatment in order to comply with air pollution control regulations.

Essentially three types of exhaust gas treatment units have been employed to remove particulate emissions from exhaust gases, namely mechanical collectors, electrostatic precipitators and fabric filters. Of these three types of separation equipment, mechanical separators are found to be less expensive to install and operate than are the other alternatives. High efficiency mechanical collectors have been developed which have proved to represent the most reliable and cost-effective manner for controlling particulate emissions from large stoker-fed, coal-fired boilers.

Where boilers and their associated mechanical collectors are maintained and operated properly, approximately 96 percent of the particulate emissions from exhaust gases can be removed with mechanical collectors at a cost of about $2.00 per pound of steam. If particulate emissions must be reduced still further, relatively high costs have been incurred in using currently developed technology. By way of example, fabric filter equipment can remove another 2 or 3 percent of the particulate matter, but at a cost of about $12.00 per pound of steam, or about 6 times the cost of operation of mechanical collectors.

A typical mechanical collector includes a housing which encloses a cluster of upstanding collector tubes through which effluent gas is passed in a downward direction. Each of the collector tubes includes an outer tube which has a tapered, funnel-shaped, lower end portion, and an inner tube extending into the upper end region of the outer tube. In operation, effluent gas enters a collector tube by passing between its inner and outer tubes. The gas is caused to take on a rotating, cyclonic motion by a series of vanes deployed between the inner and outer tubes.

The cyclonic motion of the downwardly moving gas creates a vortex. The centrifugal force of the vortex forces particulate matter outward against the inside wall of the outer tube, where it travels downwardly and falls, under the influence of gravity, into a hopper located beneath the lower end of the outer tube. The cleaned, swirling gas is tightened into a smaller vortex by the gradually tapering configuration of the lower end of the outer tube. At a location near the bottom of the outer tube, the clean gas reaches a point of equilibrium, reverses direction, and passes upwardly through the center of the inner tube under the influence of an induced draft fan. This clean gas is then ducted to a stack for discharge into the atmosphere.

The described mechanical collector works quite effectively to remove particulate matter greater than 10 microns in size. However, where very fine particulates are entrained in effluent gases, the particles (typically having a size less than 10 microns) are less susceptible to centrifugal forces, and a larger proportion remain suspended in the cleaned exhaust gases. Moreover, the sudden reversal in direction of gas flow which occurs near the bottom of each collector tube tends to re-entrain some of the fine particles that were already separated and would otherwise have remained separated.

In an effort to improve the operation of a mechanical collector of the type described above, it has been proposed that a portion of the gas stream which is heavily laden with fine particulate matter be drawn off and passed through a relatively small fabric filter unit. The proposal which has been made postulates that the drawing off of such a flow, which has come to be known in the art as a "side stream," would result in a relatively small quantity of fine-particulate-laden gas to treat. The proposal further postulates that the drawing off of a side stream flow would produce an additional downward "pull" through the collecting tube array for the remaining 80 to 90 percent of the gas stream, thereby reducing the tendency toward re-entrainment of fine particles which have already been separated. Thus the operation of a mechanical collector would be significantly enhanced, and the need for additional expensive equipment to filter fine particulates from the entire flow of cleaned gases would be eliminated.

The type of proposal which has been made for implementing and testing the side stream separator theory involves only minor changes to a conventional mechanical separator. An insulated ductwork is connected to the outer housing of the separator at a position immediately below the location of what is called the "collecting tube sheet," i.e., a metal plate which extends across the inside of the collector housing, and through which the upper ends of the collector tubes pass to receive effluent gases. Relatively large holes are formed through one or more sides of the collector housing to communicate the ductwork with the inside of the housing at a position below the location of the collecting tube sheet. An induced draft fan is coupled to the ductwork and serves to draw a side stream flow from within the housing through the ductwork and through a conventional fabric filter unit where particulates are separated from the side stream gas flow.

The above-described proposal includes no modifications to the mechanical separator itself, other than to form relatively large holes in the sides of its housing to communicate the ductwork with the inside of the housing. While the proposal includes the observation that the theoretically optimum locations for the take-off ducts leading from the mechanical collector would probably be "at each individual collection tube," the proposal discards these theoretically optimum locations as being impractical to achieve due to the complexity of the system that would be needed in order to serve the large number of tubes utilized in each mechanical collector. The proposal concludes that the best practical alternative is to simply attach the ductwork to the sides of a mechanical collector and to establish entry communication through relatively large holes formed in the sides of the collector.

SUMMARY OF THE INVENTION

The present invention addresses the problem of providing the best possible means of extracting a controlled flow of fine-particulate-laden effluent gas from regions about and among the collecting tubes of a mechanical separator. The present invention provides a simple and inexpensive means (1) for forming a plenum about the collector tubes, and (2) for positioning pickup openings quite precisely about and among the collector tubes to enable fine-particulate-laden gases to be drawn into the plenum to form a "side stream" flow which can be ducted to conventional filtration equipment to separate the particles from the gases. The pickup openings are positioned about and among the collector tubes at optimum locations to insure the best possible extraction of fine-particulate-laden gases.

In accordance with the preferred practice of the present invention, fine-particulate-laden effluent gas is extracted from a mechanical separator of the type described previously by utilizing a plenum which is provided inside the collector tube housing. Pickup openings are provided at locations about and among the collector tubes for ducting upwardly into the plenum fine-particulate-laden gases which are drawn into the collector tubes from regions surrounding the lower end regions of the collector tubes. The plenum exhausts these gases to a ductwork which carries gas effluent from the plenum to a conventional separator unit such as a fabric filter.

A feature of the invention lies in the use of a plenum which extends about and among the collector tubes, and which enables pickup openings to be optimumly positioned about and among the collector tubes. A further feature lies in the extremely simple and inexpensive means which has been developed for forming the plenum and its associated pickup openings by installing a single sheet-like structure into the lower chamber of a mechanical collector at a position spaced below and substantially paralleling the collector's collecting tube sheet. The sheet-like structure cooperates with the walls of the collector's housing and with the collecting tube sheet to define a plenum about and among the collector tubes at a location below the collecting tube sheet. Pickup openings are provided in the sheet-like structure to establish communication between the plenum and optimally selected pick-up points located about and among the collector tubes. The pickup openings may be formed by cutting holes, slots or the like in the sheet-like structure, or may be defined by short tube-like formations which depend from the region of the plenum to optimal pick-up locations.

The foregoing and other features and advantages, and a fuller understanding of the invention, may be had by referring to the following description and claims taken in conjunction with the accompanying drawings.

BRIEF DESCRIPTION OF THE DRAWINGS

FIG. 1 is a side elevational view of a mechanical separator embodying features of the present invention, with portions of the separator being broken away;

FIG. 2 is a bottom plan view of a portion of the separator of FIG. 1, as seen from a plane indicated by a line 2—2 in FIG. 1;

DESCRIPTION OF THE PREFERRED EMBODIMENT

Figure 3:
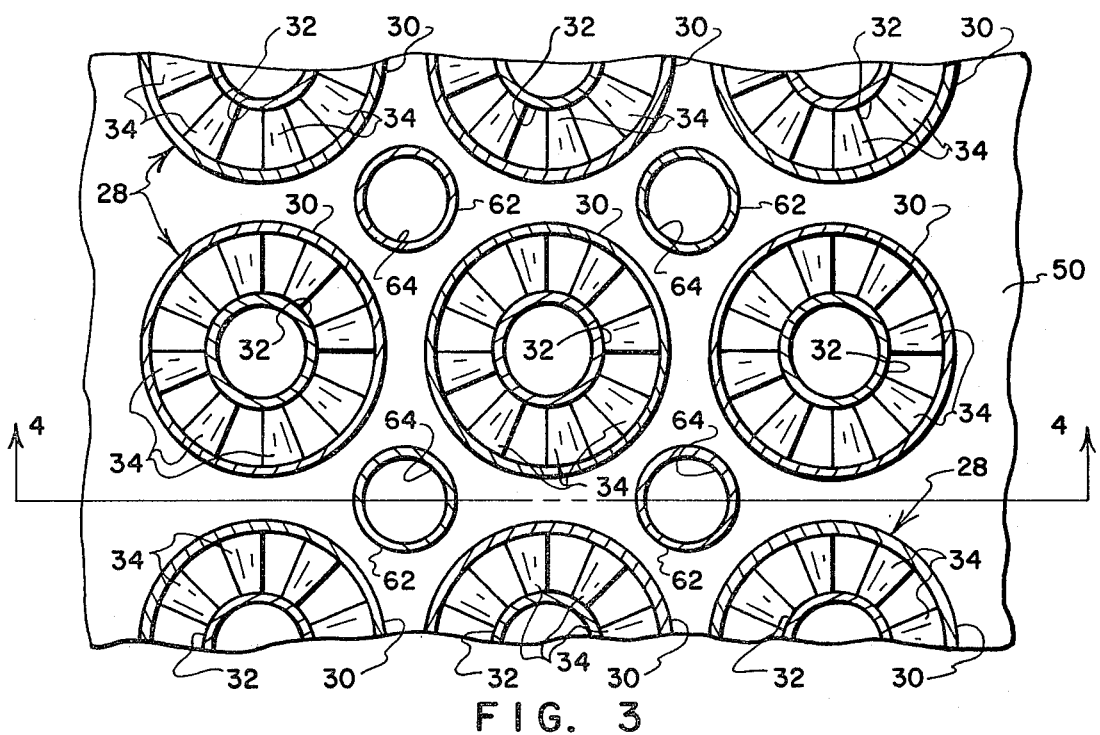
FIG. 3 is a sectional view, on an enlarged scale, as seen from a plane indicated by a line 3—3 in FIG. 1; and, FIG. 4 is a sectional view as seen from a plane indicated by a line 4—4 in FIG. 3.

Referring to FIG. 1, a mechanical separator is indicated generally by the numeral 10. The separator 10 includes an upstanding outer housing 12 having side walls 14, a top wall 16, and a tapered bottom structure 18.

A collecting tube sheet 20 extends horizontally through the housing 12, dividing the housing 12 into upper and lower chambers 22, 24. An inlet opening 26 is provided in one of the side walls 14 to admit effluent gases to the upper chamber 22. A plurality of collector tubes are indicated generally by the numeral 28. Each of the collector tubes 28 comprises an outer tube 30, an inner tube 32, and a plurality of vanes 34 interposed between the outer and inner tubes 30, 32. The outer tubes 30 project into the upper chamber 22 through holes formed in the collecting tube sheet 20. The inner tubes 32 have lower end regions extending into the outer tubes 30, and upper end regions extending through an outlet tube sheet 36 provided in the upper end of the upper chamber 22. Cleaned gases from the collecting tubes 28 are transmitted by a conventional duct (not shown) to a conventional stack (not shown) for discharge.

As is best seen in FIG. 2, the collector tubes 28 are arranged in a regular and orderly array inside the housing 12. The collector tubes 28 work in parallel to concurrently separate particulate matter from flows of effluent gas received from the upper chamber 22.

As effluent gas passes through one of the collector tubes 28, the vanes 34 cause the gas to take on a rotating, cyclonic motion which creates a vortex. The centrifugal force of the vortex forces particulate matter, especially that having a size greater than 10 microns, to travel outwardly against the inner wall of the outer tube 30, where it then travels downwardly and falls, under the influence of gravity, out of the tube 28 and into a hopper 40 located at the bottom of the tapered structure 18. Cleaned, swirling gas is tightened into a smaller vortex by the gradually tapering configuration of the bottom end of the outer tube 30, and at a location near the bottom end of the tube 30 reverses direction and passes up through the inner tube 32 under the influence of an induced draft fan (not shown) which is connected to the separator housing 10 by appropriate conventional ductwork (not shown).

The construction and operational characteristics described thus far are conventional and do not form a part of the present invention. In accordance with the improvement of the present invention, a plate or sheet-like structure 50 is installed in the lower chamber 24 at a location beneath the collecting tube plate 20. The sheet 50 has holes formed therethrough which snugly receive and are gasketed about the outer tubes 30. The sheets 20, 50 cooperate to define upper and lower ends of a plenum 52. Sides of the plenum 52 are defined by the side walls 14. One or more relatively large holes 54 are formed in one or more of the side walls 14 to communicate the plenum 52 with an insulated ductwork, indicated generally by the numeral 56.

Figure 4:
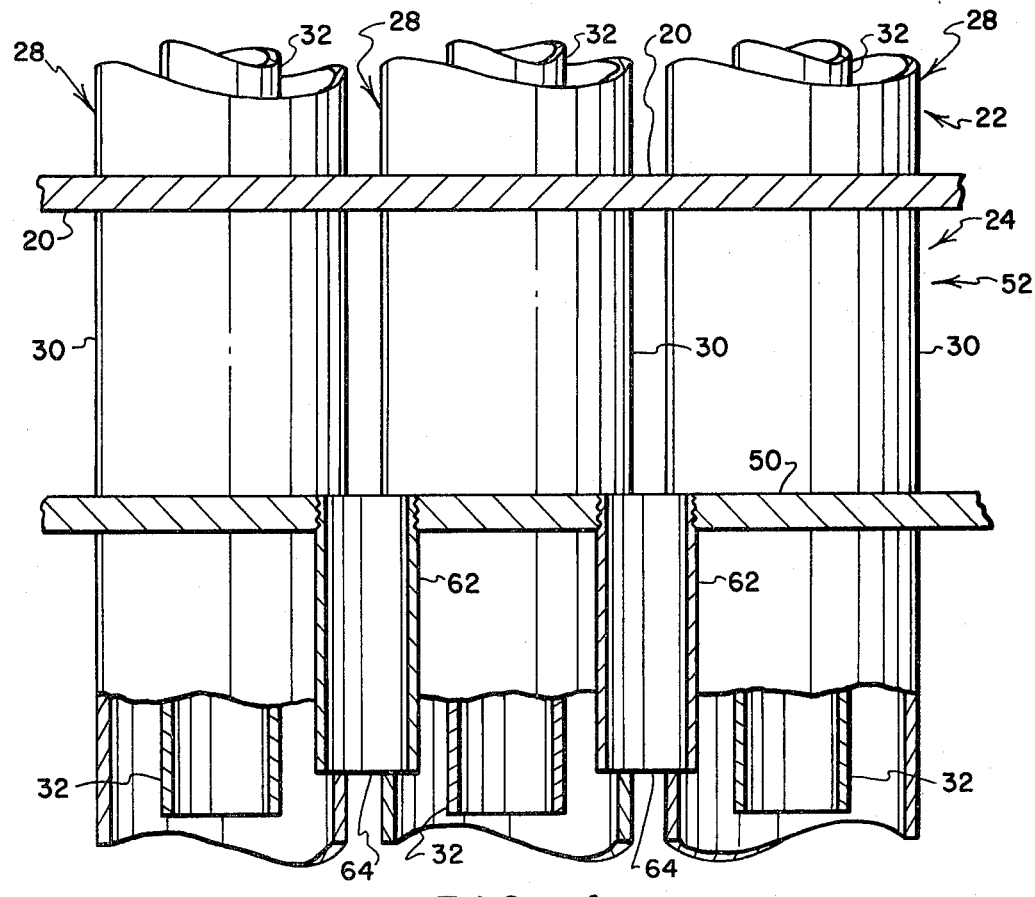

Referring to FIGS. 1-4, a plurality of pickup openings are formed in the sheet 50 to communicate the plenum 52 with regions about and among the collector tubes 28. More specifically, a plurality of slot-like pickup openings 60 are formed through the sheet 50 in regions along the perimeter of the array of collector tubes 28, and a plurality of tubular members 62 depend from the sheet 50 to establish pickup openings 64 which are located at selected positions beneath the sheet 50. The tubular members 62 communicate with the plenum through holes formed in the sheet 50.

The pickup openings provided to communicate the plenum 52 with regions about and among the collecting tubes 28 may take any of a wide variety of configurations, and may or may not be provided with depending inlet tubes 62 as is most appropriate to optimize the pickup of fine-particle-laden gases from a particular style of mechanical separator utilized in treating a particular type of effluent gas.

Whereas it has previously been deemed to be totally impractical to provide a side-stream pickup of fine-particle-laden gases from locations about and among the collector tubes of a mechanical collector, the plenum system of the present invention provides a very simple and cost-effective means which permits pickup openings of almost any desired configuration to be positioned quite precisely about and among the collector tubes of a mechanical collector to assure optimal pickup of fine-particle-laden gases.

A feature of the invention lies in a method of extracting particulate-laden effluent gases from within a mechanical separator of substantially conventional design, whereby the separator, e.g. the separator 10, is provided with a plenum 52 and pickup openings 60, 64 of the type described. Fine-particulate-laden effluent gases are drawn through the pickup openings 60, 64 and into the plenum 52, and are then directed to a suitable conventional filtering unit (not shown) where particulate matter is extracted from the gases.

Although the invention has been described in its preferred form with a certain degree of particularity, it will be understood that the present disclosure of the preferred form has been made only by way of example and that numerous changes in the details of construction and the combination and arrangement of parts may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A method of modifying an existing mechanical separator to permit extraction therefrom of a side stream flow of fine-particulate-laden effluent gases,
   wherein the mechanical separator is of the type including an outer housing defining an enclosure, a collecting tube sheet extending through the enclosure and dividing the enclosure into upper and lower chambers, and a plurality of collector tubes arranged in an array in the lower chamber and having upper portions opening through the collecting tube sheet for receiving particulate-containing effluent gases admitted to the upper chamber, each of the collector tubes being constructed to establish a cyclonic flow of gases passing therethrough for projecting particulate matter outwardly while utilizing a vortex effect to assist in reversing the direction of flow of cleaned gas and exhausting the cleaned gas from the tube along a path different from that followed by the separated particulate,
   the method including the steps of disposing sheet-like means in the lower chamber at a location about the collector tubes in spaced relation to the collector sheet to define a plenum therebetween and within said housing,
   providing the sheet-like means with a plurality of pickup openings between the collector tubes for communicating the plenum with locations spaced among the collector tubes and with the lower chamber, and
   providing exhaust means for withdrawing particulate-laden effluent gases from the plenum and for ducting such gases to separator means for removing particulate matter from such gases.

2. The method of claim 1 wherein the step of providing pickup openings includes the step of forming openings through the sheet-like member.

3. The method of claim 1 wherein the step of providing pickup openings includes the step of installing a plurality of inlet tubes in holes formed through the sheet-like member, the inlet tubes having upper end regions which communicate with the plenum, and lower end regions which define said pickup openings at locations among the collector tubes.

4. A mechanical separator for separating particulate matter from effluent gas within which the particulate matter is entrained, comprising:
   (a) housing means defining an upstanding housing;
   (b) first divider means extending substantially horizontally through the housing and dividing the housing into upper and lower chambers;
   (c) the housing means including inlet structure defining an inlet for admitting particulate-laden effluent gases into the upper chamber, and outlet structure defining an outlet for discharging cleaned gas from the lower chamber;
   (d) collector means including a plurality of collector tubes supported within the housing for receiving particulate-laden effluent gases admitted into the upper chamber, for discharging particulate from such gases into the lower chamber; and for discharging substantially cleaned gas toward said outlet structure,
   (e) localized extraction means for withdrawing a portion of the particulate-laden effluent gases from selected locations in the lower chamber among the collector tubes, the extraction means including:
      (i) second sheet-like divider means extending through the housing at a location spaced below the first divider means;
      (ii) the first and second divider means and postions of the housing means defining a plenum about the collector tubes;
      (iii) a plurality of pickup openings communicating the plenum with said selected locations; and
      (iv) plenum outlet means, whereby effluent gases may be may be drawn through the pickup openings and into the plenum before being ducted from the plenum for treatment to separate particulate from such gases.

5. The mechanical separator of claim 4 additionally including duct means located outside the housing means and communicating with the plenum outlet means through at least one hole formed through the housing means for ducting effluent gases from the plenum for treatment to separate particulate from such gases.

* * * * *